(12) United States Patent
Woutters

(10) Patent No.: US 10,544,253 B2
(45) Date of Patent: Jan. 28, 2020

(54) METHOD FOR IMPROVING FRACTURE TOUGHNESS OF POLYISOCYANURATE COMPRISING REACTION PRODUCTS

(71) Applicant: Huntsman International LLC, The Woodlands, TX (US)

(72) Inventor: Steve Andre Woutters, Deurne (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 15/505,771

(22) PCT Filed: Jul. 9, 2015

(86) PCT No.: PCT/EP2015/065675
§ 371 (c)(1),
(2) Date: Feb. 22, 2017

(87) PCT Pub. No.: WO2016/034313
PCT Pub. Date: Mar. 10, 2016

(65) Prior Publication Data
US 2017/0283545 A1      Oct. 5, 2017

(30) Foreign Application Priority Data
Sep. 5, 2014 (EP) .................................. 14183799

(51) Int. Cl.
C08G 18/79       (2006.01)
C08G 18/63       (2006.01)
(Continued)

(52) U.S. Cl.
CPC ......... C08G 18/638 (2013.01); C08G 18/022 (2013.01); C08G 18/092 (2013.01);
(Continued)

(58) Field of Classification Search
CPC ................ C08G 18/791; C08G 18/794; C08G 18/7671; C08G 18/7664; C08G 18/638; C08G 18/022; C08G 18/04; C08G 18/092
See application file for complete search history.

(56) References Cited

U.S. PATENT DOCUMENTS 4,946,922 A * 8/1990 Reisch ............... C08G 18/4009
                                            252/182.18
5,312,848 A * 5/1994 Klapper ............... C08G 18/092
                                            264/46.4
(Continued)

FOREIGN PATENT DOCUMENTS

EP         485008    *  5/1992  ............ C08G 18/10
WO    2010121898 A     10/2010

OTHER PUBLICATIONS

Structural Composite Lumber. https://www.apawood.org/structural-composite-lumber. 2018.*

(Continued)

*Primary Examiner* — Michael L Leonard
(74) *Attorney, Agent, or Firm* — Huntsman International LLC; Robert Diaz

(57) ABSTRACT

A curable composition for making polyisocyanurate comprising products obtained by combining and mixing at an isocyanate index of at least 100 at least a polyisocyanate composition, an isocyanate reactive composition comprising at least 50 mol % diols and a toughening agent comprising acrylic block copolymers.

20 Claims, 2 Drawing Sheets

Figure 1A:
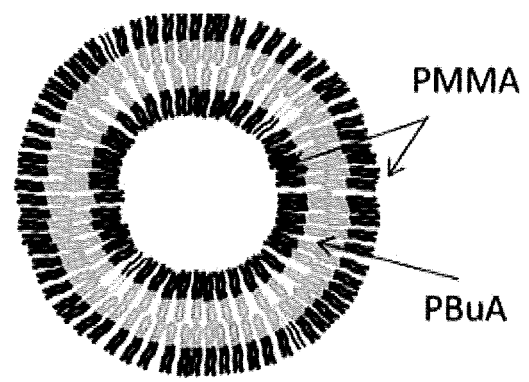

(51) Int. Cl.
*C08G 18/58* (2006.01)
*C08G 18/76* (2006.01)
*C08G 18/40* (2006.01)
*C08G 18/42* (2006.01)
*C08L 75/08* (2006.01)
*C08G 18/48* (2006.01)
*C08G 18/22* (2006.01)
*C08G 18/09* (2006.01)
*C08G 18/02* (2006.01)
*C08L 33/14* (2006.01)
*C08F 220/36* (2006.01)
*C08G 18/04* (2006.01)

(52) U.S. Cl.
CPC ....... *C08G 18/225* (2013.01); *C08G 18/4045* (2013.01); *C08G 18/4072* (2013.01); *C08G 18/4213* (2013.01); *C08G 18/4825* (2013.01); *C08G 18/58* (2013.01); *C08G 18/7664* (2013.01); *C08G 18/7671* (2013.01); *C08G 18/791* (2013.01); *C08G 18/794* (2013.01); *C08L 75/08* (2013.01); *C08F 220/36* (2013.01); *C08G 18/04* (2013.01); *C08L 33/14* (2013.01); *C08L 2205/03* (2013.01)

(56) References Cited

U.S. PATENT DOCUMENTS

| | | | | |
|---|---|---|---|---|
| 6,831,116 B2* | 12/2004 | Bitler | ................... | C08G 59/18 523/210 |
| 7,056,976 B2* | 6/2006 | Joshi | ................... | C08G 18/0885 264/137 |
| 2006/0084755 A1* | 4/2006 | Good | ................ | C08G 18/4063 524/589 |
| 2011/0230609 A1* | 9/2011 | Oshita | ................. | C08G 18/289 524/197 |
| 2012/0046436 A1 | 2/2012 | Debien et al. | | |
| 2014/0186611 A1* | 7/2014 | Skowronski | ....... | C08G 18/4829 428/304.4 |
| 2015/0051358 A1* | 2/2015 | Bunnelle | ............. | C08G 18/664 525/92 C |

OTHER PUBLICATIONS

Sandrine Tea: "Polymeric Nanoparticles for the Modification of Polyurethane Coatings", Dec. 31, 2011 (Dec. 31, 2011), pp. 1-151, XP002732996.

* cited by examiner

METHOD FOR IMPROVING FRACTURE TOUGHNESS OF POLYISOCYANURATE COMPRISING REACTION PRODUCTS

CROSS-REFERENCE TO RELATED APPLICATIONS

This application is the National Phase of International Application PCT/EP2015/065675 filed Jul. 9, 2015 which designated the U.S. and which claims priority to European App. Serial No. 14183799.7 filed Sep. 5, 2014. The noted applications are incorporated herein by reference.

FIELD OF INVENTION

The present invention relates to methods for improving the fracture toughness of polyisocyanurate comprising materials.

The present invention is further related to the use of special polyol compositions in order to make the polyisocyanurate matrix of the polyisocyanurate comprising materials more toughnable.

The present invention is further related to the use of specific block copolymer toughening agents to increase the fracture toughness of the polyisocyanurate comprising materials.

The present invention further relates to polyisocyanurate comprising materials having increased toughness.

The present invention further relates to polyisocyanurate comprising materials having a glass transition temperature >100° C.

In particular the invention relates to polyisocyanurate comprising materials prepared by using at least >50 wt % polyisocyanates calculated on the total weight of the reactive curable composition, preferably more than 60%.

The polyisocyanurate comprising materials according to the present invention are very suitable to make polyisocyanurate comprising materials (PIR) having a glass transition temperature >100° C. and a significantly improved fracture toughness value.

BACKGROUND OF THE INVENTION

Structural composites are known to be useful for many applications such as electrical, aerospace, transportation and outdoor sports equipment's applications.

Isocyanate polyaddition reaction products such as polyisocyanurate comprising materials are commonly used as the polymer matrix in structural composites. The cured polyisocyanurate comprising materials are known for their good thermal, mechanical, and chemical properties but they lack toughness and tend to be brittle upon cure.

In addition, the polyisocyanurate comprising materials are known to be very difficult to toughen and some may be too brittle to toughen effectively. Attempts to increase the fracture toughness in the past often came at the expense of changes (typically reduction) in modulus and of reductions in thermal properties e.g. glass transition temperature ($T_g$) thereby creating unacceptable limits on the applicability of the resulting composite.

For example, to increase the toughness of polyisocyanurate comprising materials, plasticizers have been added as additives giving these materials improved flexibility and durability. Most commonly phthalate esters were used as plasticizers. Plasticizers work by embedding themselves between the chains of polymers, spacing them apart (increasing the "free volume"), however, this improvement in toughness usually lead to a significant drop in modulus and glass transition temperature ($T_g$).

Controlling the fracture toughness of polyisocyanurate comprising materials may also be done by varying the amount of polyols having a high molecular weight. This however also leads to materials having lower glass transition temperatures and lower modulus.

Alternatively the fracture toughness of polyisocyanurate comprising materials may also be done by adding core shell particles however this comprises the addition of solid particles to a liquid resin which implies stability issues.

Accordingly, there is a need in the industry to develop a curable polyisocyanate composition for making structural polyisocyanurate comprising composites with improved ductility (i.e. fracture toughness) while still maintaining other key processing (e.g. viscosity) and performance (e.g. glass transition temperature and modulus) properties.

AIM OF THE INVENTION

It is a goal of the invention to improve the fracture toughness of polyisocyanurate comprising materials having a glass transition temperature ($T_g$)>100° C.

It is a further object of the present invention to develop structural polyisocyanurate comprising components which can withstand high external forces and can be used, for example, in automobile construction. The structural components to be developed, also referred to as composite elements, should be able to serve as replacements for known steel structures and, in particular, have advantages in respect of their weight, manufacturing process and maintenance intensity.

SUMMARY OF THE INVENTION

According to a first aspect, a curable composition for making polyisocyanurate comprising products is disclosed, said composition obtained by combining and mixing at an isocyanate index of at least 100:
a) A polyisocyanate composition,
b) An isocyanate reactive composition comprising at least 50 mol %, preferably at least 70 mol %, more preferably at least 90 mol % diols calculated on the total number of mol isocyanate reactive compounds in the isocyanate-reactive composition,
c) A toughening agent comprising acrylic block copolymers,
d) A trimerization catalyst composition, and
e) Optionally further additives and/or auxiliary compounds.
wherein the amount of polyisocyanates in the curable composition comprises at least 50 wt % polyisocyanates calculated on the total weight of the reactive curable composition.

According to embodiments, the amount of polyisocyanates in the curable composition comprises preferably at least 60 wt % polyisocyanates calculated on the total weight of the reactive curable composition.

According to embodiments, the isocyanate-reactive composition comprises aromatic polyols, preferably aromatic polyester polyols, more preferably aromatic polyester diols.

According to embodiments, the diols have a molecular weight (MW) below 1000 g/mol, preferably below 500 g/mol and comprise alkylene glycols and/or oxyalkylene glycols corresponding to the formula $C_nH_{2n}(OH)_2$ and $C_nH_{2n}O(OH)_2$.

According to embodiments, the diols are selected from polyethylene glycol and/or polypropylene glycol-(1,2) and -(1,3), polybutylene glycol-(1,4) and -(2,3), polyhexanediol-(1,6), polyoctanediol-(1,8) and mixtures thereof.

According to embodiments, the block copolymer toughening agent is a self assembling block copolymer wherein at least one block is a polyisocyanate/polyisocyanurate miscible block having a glass transition temperature ($T_g$) above 100° C. and at least one block is a polyisocyanate/polyisocyanurate immiscible block having a $T_g$ below 0° C., more preferably below −40° C. and wherein the copolymer is present in the curable composition in a range from 0.1 wt % to 30 wt %, preferably 0.5 wt % to 15 wt %, more preferably from 1 wt % to 10 wt % based on the total weight of the curable composition.

According to embodiments, the block copolymer toughening agent is a self assembling block copolymer having a number average molecular weight (MW) of at least 1000 g/mol, preferably in the range 10000-500000 g/mol, more preferably in range 20000-200000.

According to embodiments, the polyisocyanate/polyisocyanurate miscible block of the block copolymer is selected from polymethylmetacrylate ($T_g$=105° C.) and/or polystyrene ($T_g$=100° C.) and the polyisocyanate/polyisocyanurate immiscible block of the block copolymer is selected from polyalkylacrylates and/or polydienes, in particular polybutadiene such as 1,4-polybutadiene and/or polyisoprene and their random copolymers.

According to embodiments, the polyisocyanates are selected from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2.

According to embodiments, the trimerisation catalyst composition is selected from alkali and/or earth alkali metal salts of organic carboxylic acids preferably having 1-12 carbon atoms, such as potassium acetate or potassium 2-ethylhexanoate such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to embodiments, the trimerisation catalyst composition is selected from a composition containing a lithium halide (preferably LiCl), an epoxy resin and optionally a urea compound.

According to embodiments, the trimerisation catalyst composition is used in a quantity of from 0.001 to 10 wt %, preferably from 0.1 to 5 wt %, most preferably 0.5 to 2.0 wt % calculated on the total weight of the curable composition.

According to embodiments, the auxiliary compounds are selected from non-isocyanate-reactive solvents, surfactants, scavengers, like alkylorthoformate and in particular triisopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, the auxiliary compounds comprise filler materials which are selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

According to a second aspect, a process (method) for making the curable composition of the first aspect is disclosed, said process comprises combining and mixing the ingredients (a) to (e) at ambient pressure and at a temperature between 5° C. and 45° C. and more preferably between 5° C. and 30° C.

According to embodiments, the method comprises at least the steps of allowing the curable composition according to the first aspect to react at an isocyanate index of at least 100 and at a curing temperature above 50° C. and preferably above 80° C.

According to embodiments, the method is a batch-wise, semi-continuously or continuously process, an injection-, an extrusion-, a pultrusion process or moulding process such as a compression moulding process, a resin transfer moulding process, a vacuum assisted moulding process, a resin infusion moulding process, a prepregging process.

According to embodiments, the isocyanate index is in the range 100 up to 15000, preferably in the range 100-500, more preferably in the range 100-300.

According to embodiments, the curing temperature is between 50° C. and 350° C. and most preferably in the range between 125° C. and 250° C.

According to a third aspect, a polyisocyanurate comprising material is disclosed, said material obtained by the method according to the second aspect and having a glass transition temperature >100° C., a fracture toughness value $G_{1c}$>1000 J/m$^2$, preferably $G_{1c}$>1500 J/m$^2$ and/or toughness value $K_{1c}$>2 MPa·m$^{1/2}$.

Further according to a third aspect, a polyisocyanurate comprising material is disclosed, said material obtained by the method according to the second aspect and having a glass transition temperature >150° C., a toughness value $G_{1c}$>500 J/m$^2$, more preferably >600 J/m$^2$, and/or a toughness value $K_{1c}$>1 MPa·m$^{1/2}$.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

Definitions and Terms

In the context of the present invention the following terms have the following meaning:
1) The composition comprising at least a polyisocyanate composition, a trimerisation catalyst composition and a curing agent compound which comprises isocyanate-reactive hydrogen atoms (such as a polyol) or any other suitable curing agent is in the text referred to as the "curable composition". This composition refers to a liquid composition prior to curing (i.e. prior to the formation of polyisocyanurates).
2) The "isocyanate index" or "NCO index" or index is the ratio of NCO-groups over isocyanate-reactive hydrogen atoms present in a formulation, given as a percentage:

$$\frac{[NCO]}{[\text{active hydrogen}]} \times 100(\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are taken into account in the calculation of the isocyanate index.

3) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Liquid" means having a viscosity of less than 10 Pa·s measured according to ASTM D445-11a at 20° C.

7) "Trimerisation catalyst" as used herein refers to a catalyst being able to catalyse (promote) the formation of isocyanurate groups from polyisocyanates.

8) "Polyisocyanurate comprising materials" refers to a composition comprising more than 10% by weight polyisocyanurate, preferably at least 50% by weight polyisocyanurate, more preferably 75% by weight, calculated on the total weight of the material.

9) "Mc" refers to the average molecular weight between cross-links, e.g. the average molecular weight between cross-links of 2 isocyanurate groups in the polyisocyanurate comprising materials.

10) "Density" refers to the overall density measured according to ISO 845.

11) The "glass transition temperature" ($T_g$) refers to the temperature at which a reversible transition from a hard glass condition into a rubber-elastic condition occurs. The glass transition temperature ($T_g$) was measured according to ASTM D 4065-1, with a forced constant amplitude and a fixed frequency in a dual cantilever. The peak maximum of the Tangent Delta (tan d) profile is taken as the $T_g$ 12) "Fracture toughness" is a measure of the energy a sample with a pre-existing crack can absorb before it breaks. In the context of the present invention, the fracture toughness is expressed as a $K_{1c}$ value and/or $G_{1c}$ value, both measured according to ISO 13586. The $G_{1c}$ value (unit J/m$^2$) or the critical energy release rate is a measure for the fracture energy. The $K_{1c}$ value or the critical stress intensity factor is a measure for the critical stress intensity resistance to crack growth initiation. The higher the $G_{1c}$ or $K_{1c}$ value, the better the material is resistant to crack growth initiation.

13) "Copolymers" [1] refer to polymers having two or more different monomer units. "Block copolymers" [2] comprise two or more homopolymer blocks linked by covalent bonds. Suitable block co-polymers according to the present invention have at least one block characterized as a mainly polyisocyanate/polyisocyanurate miscible block and at least one block characterized as a mainly polyisocyanate/polyisocyanurate immiscible block. The block copolymers which can be employed in the present invention may include, for example, a diblock copolymer, a linear triblock, a linear tetrablock, a higher order multiblock structure, a branched block structure, or star block structure.

-A-B-A-B-A-B-A-B-A-B- [1]

-B-B-B-B-B-A-A-A-A-A- [2]

14) "Acrylate block Copolymers" or "Acrylic block Copolymers" refers to block copolymers comprising acrylate homopolymer blocks. Examples of suitable acrylate homopolymer blocks are Methacrylates, Methyl acrylates, Ethyl acrylates, 2-Ethylhexyl acrylate, Hydroxyethyl methacrylates, Butyl acrylates, Butyl methacrylate, . . . .

FIGURES

Figure 1B:
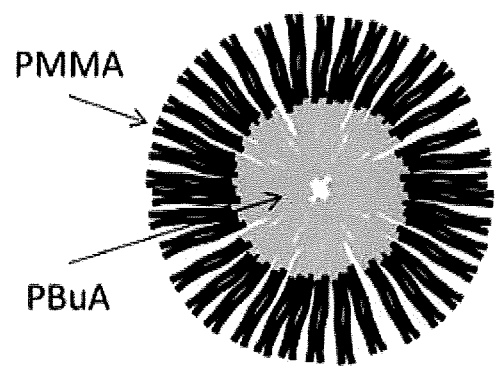

FIGS. 1A and 1B illustrate acrylic block copolymers according to the invention which self-assemble. FIG. 1A illustrates a self assembling acrylic block copolymer which consist of a center block of polybutylacrylate (PBuA) and two side blocks of polymethylmethacrylate (PMMA). FIG. 1B illustrates a self assembling acrylic block copolymer consisting of one polymethylmethacrylate block (PMMA) and one polybutylacrylate block (PBuA).

Figure 2:
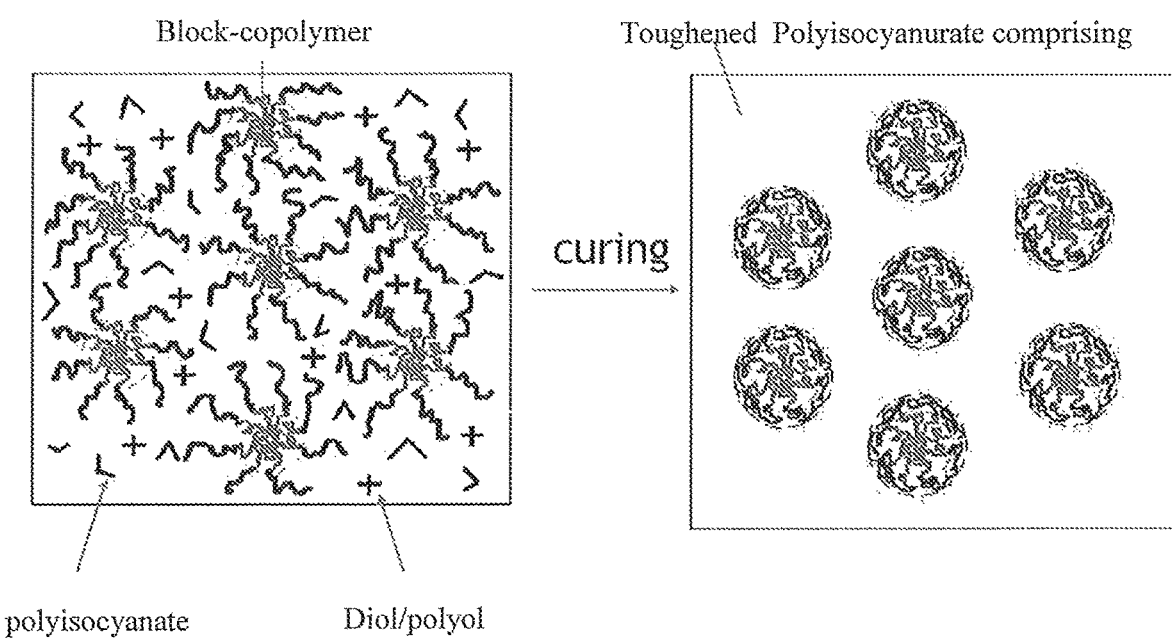

FIG. 2 illustrates the presence of self assembled block copolymers according to the invention in the polyisocyanurate material after curing.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

Surprisingly we have found that polyisocyanurate comprising materials prepared by using >50 wt % polyisocyanates calculated on the total weight of the reactive curable composition and having a glass transition temperature of at least 100° C. may be significantly improved in fracture toughness and modulus of the products.

Therefore, the invention is dealing with a curable polyisocyanate composition and a method for making said curable composition, said curable composition being suitable for making polyisocyanurate comprising materials with a significant increase in fracture toughness. The curable polyisocyanate composition according to the invention comprises on the one hand special polyol compositions as isocyanate reactive compounds (curing agent) and on the other hand block copolymers as additional toughening agents. The polyisocyanate reactive composition will modify the polyisocyanurate comprising matrix after curing, while the toughening agent will be present as a second-phase within the polyisocyanurate comprising matrix after curing.

According to embodiments, the curable polyisocyanate composition is achieved by combining at least:
a) A polyisocyanate composition,
b) An isocyanate reactive composition comprising at least 50 mol %, preferably at least 70 mol %, more preferably at least 90 mol % diols calculated on the total number of mol isocyanate reactive compounds in the isocyanate-reactive composition,
c) A toughening agent comprising acrylic block copolymers,
d) A trimerization catalyst composition, and
e) Optionally further additives and/or auxiliary compounds.

Wherein the amount of polyisocyanates in the curable composition comprises at least 50 wt % polyisocyanates, preferably >60 wt % polyisocyanates calculated on the total weight of the reactive curable composition.

The invention may comprise a dual approach wherein on the one hand molecular redesign of the polyisocyanurate matrix is realized by using special polyol compositions as isocyanate reactive composition and on the other hand introduction of block copolymers in the polyisocyanurate matrix. The dual approach is crucial if it is the ambition to increase the fracture toughness significantly (e.g. order of magnitude increase of $G_{1c}$).

According to embodiments, the molecular redesign of the polyisocyanurate matrix is achieved by configuring the molecular weight between the crosslinks ($M_c$, g/mole). The molecular weight between crosslinks, $M_c$, is preferably >300 g/mole, more preferably >500 g/mole, most preferably ≥700 g/mole. The aim is to increase the molecular weight between the crosslinks hereby reducing the crosslink density.

According to embodiments, the molecular redesign of the polyisocyanurate matrix may be achieved by using low molecular weight diols (MW<1000). These low molecular weight diols may act as 'spacers' between isocyanurate crosslinks.

According to embodiments, the molecular redesign of the polyisocyanurate matrix is achieved by using mainly diols as isocyanate reactive composition (polyols having 2 hydroxyl groups giving 2 isocyanate reactive hydrogens).

According to embodiments, the molecular redesign of the polyisocyanurate matrix may be achieved by using mainly diols that have covalent bonds with low energy barriers to rotation. Examples of such 'rotatable' bonds are ester and/or ether bonds.

According to embodiments, the molecular redesign of the polyisocyanurate matrix may be achieved by using mainly diols as isocyanate reactive composition. The isocyanate reactive composition may comprise aromatic polyols, preferably said aromatic polyols are aromatic polyester polyols, most preferably said aromatic polyols are aromatic polyester diols. The use of these aromatic (polyester) polyols will limit the decrease, maintain or further increase the aromaticity of the polyisocyanurate matrix. This is a method to retain the modulus of the resin. In case additional aromatic polyols are present in the isocyanate reactive composition, the concentration is always such that the amount of diols is at least at least 50 mol %, preferably at least 70 mol %, more preferably at least 90 mol % diols calculated on the total mol isocyanate reactive compounds in the isocyanate-reactive composition.

According to preferred embodiments, the suitable diols are selected from glycols having a molecular weight (MW) below 1000 g/mol, preferably below 500 g/mol, even more preferable below 300 g/mol. They are advantageously simple glycols of the general formula $C_nH_{2n}(OH)_2$ or polyglycols distinguished by intervening ether linkages in the hydrocarbon chain, as represented by the general formula $C_nH_{2n}O(OH)_2$. Examples of suitable glycols include: polyethylene glycol (such as diethylene glycol, triethylene glycol and tetraethylene glycol), polypropylene glycol-(1,2) and -(1,3) (such as dipropylene glycol, tripropylene glycol and tetrapropylene glycol), poly butylene glycol-(1,4) and -(2,3), poly hexanediol-(1,6), poly octanediol-(1,8), . . . and mixtures thereof.

According to embodiments, suitable aromatic polyester polyols are PET polyols (diols), in this case high segmental resistance to bending and stretching, leading to stiffness, is combined with segmental flexibility due to the presence of rotatable ester bonds).

In an aromatic polyester polyol at least one of the polyol or the polycarboxylic acid, preferably the acid, is an aromatic compound and the aromaticity is at least 40 wt % calculated on the total weight of the polyester polyol. Polyester polyols whose acid component advantageously comprises at least 30 wt % of phthalic acid (or isomers thereof) residues are particularly useful. Preferably the aromaticity of the aromatic polyester polyol is between 70 and 90 wt % calculated on the total weight of the polyester polyol. Preferred aromatic polyester polyols for use in the present invention include STEPA® POL PS2352, PS3152 and PS 1752, all commercially available from Stepan; Hoopol® F-1390, F-1391, F-3362, F-4361, F-4396 and F-7021, all commercially available from Syntesia; and Isoexter® 3061, 3557, 3446 and 4404, all commercially available from Coim.

The block copolymer toughening agent of the present invention preferably will act as a second-phase toughening agent, which self assembles into a second phase domain in the host polyisocyanurate comprising matrix after curing to further improve the toughness of the (cured) polyisocyanurate comprising material. The self-assembled block copolymers exhibit surfactant-like morphologies which provide enhanced fracture toughness at very low block copolymer loadings (for example, from about 1% to about 10% by weight based on the total weight of the polyisocyanurate comprising material).

The "second phase" means a distinct and different physical phase from the other phase of the polyisocyanurate comprising matrix. Because the modification is limited to a second phase, only lower levels of the block copolymer are needed to achieve the desired level of toughness. In general, the effective quantity of the block copolymer as the toughening agent in the present invention may be in the range of from about 0.1% to about 30% by weight; preferably, from about 0.5% to about 15% by weight; and more preferably from about 1% to about 10% by weight based on the total weight of the final polyisocyanurate comprising product.

In a preferred embodiment, the block copolymer may include, for example, a diblock copolymer, a linear triblock, a linear tetrablock, a higher order multiblock structure, a branched block structure, or star block structure.

Block copolymers have a structure comprising chemically dissimilar homopolymer sequences covalently linked to each other. In bulk or in a selective solvent (e.g. polyisocyanate or polyisocyanurate) block copolymers spontaneously self-assemble to form nanostructured morphologies.

According to embodiments, two or more different block copolymers may be blended together to make up the block copolymer component of the present invention. Preferably, in each block copolymer at least one block is a polyisocyanate/polyisocyanurate miscible block and at least one block is a polyisocyanate/polyisocyanurate immiscible block.

The block copolymer toughening agent of the present invention preferably comprises at least one or more block copolymers wherein at least one block is a polyisocyanate/polyisocyanurate miscible block having a high $T_g$ preferably above 100° C. and at least one block is a polyisocyanate/polyisocyanurate immiscible block having a low $T_g$ (rubbery), preferably below 0° C., more preferably <-40° C.

According to embodiments, the block copolymer is non-reactive with the polyisocyanate/polyisocyanurate matrix, meaning that the monomers being present in the block copolymer have no reactive groups towards polyisocyanate. This has the advantage that the use of the block copolymers can provide increases in toughening without significant sacrificing $T_g$ or modulus.

The block copolymer used in the present invention may have a number average molecular weight (MW) of at least 1000 g/mol, preferably between 10000 g/mol and 500000 g/mol, more preferably between 20000 and 200000 g/mol for the combination of both polyisocyanate/polyisocyanurate miscible block and polyisocyanate/polyisocyanurate immiscible block.

Examples of monomers used to synthesize the polyisocyanate/polyisocyanurate immiscible block of the block copolymer may be selected from a diene chosen from butadiene, isoprene, 2,3-dimethyl-1,3-butadiene, 1,3-pentadiene or 2-phenyl-1,3-butadiene. The polyisocyanate/polyisocyanurate immiscible block is advantageously chosen from polydienes, in particular polybutadiene, polyisoprene and their random copolymers, or from partially or completely hydrogenated polydienes. Use is advantageously made, among polybutadienes, of those with the lowest Tg, for example 1,4-polybutadiene with a $T_g$ ($T_g$ approximately −90° C.) lower than that of 1,2-polybutadiene ($T_g$ approximately 0° C.).

Examples of monomers used to synthesize the polyisocyanate/polyisocyanurate immiscible block of the block copolymer may be selected from alkyl acrylates. The following $T_g$ values are obtained: ethyl acrylate (−24° C.), butyl acrylate (−54° C.), 2-ethylhexyl acrylate (−85° C.), hydroxyethyl acrylate (−15° C.), . . . . Butyl acrylate is advantageously used. The acrylates are different from those in the polyisocyanate/polyisocyanurate miscible block of the block copolymer in order to observe the condition that the polyisocyanate/polyisocyanurate miscible and immiscible blocks are incompatible.

Examples of monomers used to synthesize the polyisocyanate/polyisocyanurate miscible block of the block copolymer may be selected from methylmetacrylate ($T_g$=105° C. and styrene ($T_g$=100° C.), . . . .

According to embodiments, the block copolymer has at least one polyisocyanate/polyisocyanurate miscible block predominantly composed of methyl methacrylate monomers, preferably composed of at least 50% by mass of methyl methacrylate, more preferably at least 75% by mass of methyl methacrylate.

According to preferred embodiments, the block-copolymers are self-assembling block copolymers which may self-organise into nanostructures. Suitable block copolymers which may self-assemble preferably consist of two or three blocks of linear chains covalently bonded to one another wherein one of the blocks is a polyisocyanate/polyisocyanurate immiscible block and at least one of the blocks is a polyisocyanate/polyisocyanurate miscible block. For example suitable block-copolymer may consist of a center block of polybutylacrylate (PBuA) and two side blocks of polymethylmethacrylate (PMMA). Because of repulsive interactions between the three blocks, the block copolymer will self-organize at the nanometer scale leading to self-assembled block copolymers. Blended with a polymer compatible with one of their blocks, the self-assembled block copolymers disperse easily and impose a structuration to the host matrix. This organization imparts unique combinations of properties, such as impact strength, high rigidity and transparency. Due to the self-assembling properties leading to nanostructuration, the block copolymers can provide superior toughening as compared to reactive rubber flexibilizers. In fact self-assembled block copolymers can be used at significantly low concentrations. Additional advantages of self-assembled block copolymers include the ability to dissolve these polymers in the polyisocyanate/polyisocyanurate matrix and there is no need for time consuming and inconsistent dispersion beforehand.

According to embodiments, the block copolymer is a triblock copolymer having two polyisocyanate/polyisocyanurate miscible blocks and one polyisocyanate/polyisocyanurate immiscible block (hereinafter "B") which can be represented as "A-B-A". The triblock copolymer compositions with regard to the amount of polyisocyanate/polyisocyanurate miscible A blocks and polyisocyanate/polyisocyanurate immiscible B blocks expressed as fraction by mass (the total being 100%) is:
  10%-80%, preferably 15%-70% A blocks
  90%-20%, preferably 85%-30% B blocks.

According to embodiments, the block copolymers are self-assembling acrylic block copolymers, such as commercially available Nanostrength® block copolymers, e.g. block copolymers consisting of polymethylmethacrylate blocks (PMMA) and polybutylacrylate blocks (PBuA). The PMMA blocks give compatibility to the polyisocyanurate matrix while the PBuA blocks provide an immiscible soft rubber phase for toughening. Commercially available acrylic triblock copolymers are M51, M52 and M52N from Nanostrength®, these so-called ABA-type block copolymers-PMMA-PBuA-PMMA consist of rigid PMMA and rubbery PBuA blocks. The M51, M52 and M52N block copolymers easily dissolve in polyisocyanate/polyisocyanurate and self-organize on the nanolevel because of the affinity between isocyanate/isocyanurate and PMMA on the one side and repulsion between the isocyanate/isocyanurate and the middle PBuA block. Other commercially available suitable block copolymers are M22N, M53 and D51N from Nanostrength®. FIG. 1A illustrates the dispersed phases in the polyisocyanurate matrix, illustrating spherical micelles made of a spherical hard shell enclosing a rubbery core.

In another embodiment of the present invention, when the block copolymer has a multiblock copolymer structure, other blocks in addition to the polyisocyanurate miscible block and polyisocyanurate immiscible block may be present in the block copolymer.

The block copolymer toughening agent used in the present inventions further improves the fracture resistance, hence improves the fracture toughness, of the polyisocyanurate comprising material. A synergetic effect on the improvement in toughness of the polyisocyanurate comprising material is seen when the copolymer toughening agent is used in combination with the use of specific diols (polyols) in the process for making the isocyanurate matrix.

The amount the block copolymer toughening agent used to make the polyisocyanurate comprising material according to the invention is generally from about 0.1 wt % to about 30 wt % based on the total weight of the polyisocyanurate comprising material; preferably from about 0.5 wt % to about 15 wt % based on the total weight of the polyisocyanurate comprising material; and more preferably from about 1 wt % to about 10 wt % based on the total weight of the polyisocyanurate comprising material.

The amount the block copolymer toughening agent used to make the polyisocyanurate comprising material according to the invention is generally from about 0.1 wt % to about 30 wt % based on the total weight of the curable composition; preferably from about 0.5 wt % to about 15 wt % based on the total weight of the curable composition; and more preferably from about 1 wt % to about 10 wt % based on the total weight of the curable composition.

According to embodiments, the polyisocyanates may be chosen from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate, diphenylmethane diisocyanates and/or polymethylene polyphenylene polyisocyanates may be used as well.

Any compound which catalyses the isocyanate trimerisation reaction (isocyanurate-formation) can be used as trimerisation catalyst in the present invention.

According to embodiments, the trimerization catalyst composition comprises compounds selected from organic metal salts, preferably alkali or earth alkali organic metal salts, more preferably metal carboxylates or alkoxides and mixtures thereof, the carboxylate/alkoxide group preferably having 1-12 carbon atoms such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to embodiments, the trimerisation catalyst composition may be selected from alkali metal salts of organic carboxylic acids, such as potassium acetate (commercially available as Polycat® 46 (ex Air Products) and Catalyst LB (ex Huntsman)) or potassium 2-ethylhexanoate (commercially available as Dabco® K15 (ex Air Products)), since these do not promote the isocyanate/water reaction as much as amine containing catalysts. Excessive isocyanate/water reaction will lead to preliminary cure.

According to embodiments, trimerization catalyst composition is selected from a composition containing a lithium halide (preferably LiCl), an epoxy resin and optionally a urea compound. This catalyst composition is described in WO2010/121898 which is incorporated herein by reference. Typically the catalyst composition is such that the number of moles of lithium halide per isocyanate equivalent ranges of from 0.0001-0.04.

The trimerisation catalyst composition is generally such that the amount of catalyst compounds being present in the catalyst composition is in range 0.001 to 10% by weight, preferably from 0.1 to 5 wt %, most preferably 0.5 to 2.0 wt % based on total weight of the curable composition.

In addition to the trimerisation promoting catalyst a catalyst to control the curing of the polyurethane can be added. But in preferred embodiments such a catalyst is not present.

Examples of such suitable (polyurethane forming) catalysts are those known per se and include tertiary amines, such as triethyl-, tripropyl-, tributyl- and triamylamine, N-methyl morpholine, N,N-dimethyl cyclohexylamine, N,N-dimethyl benzylamine, 2-methyl imidazole, pyrimidine, dimethylaniline and triethylene diamine. Examples of tertiary amines containing isocyanate-reactive hydrogen atoms are triethanolamine and N,N-dimethyl ethanolamine. Other suitable catalysts are silamines having carbon-silicon bonds and nitrogen-containing bases such as tetraalkyl ammonium hydroxides; alkali hydroxides, alkali phenolates and alkali alcoholates. Organo metallic compounds, especially organo tin compounds, may also be used as catalysts.

The curable composition used to make the polyisocyanurate comprising material according to the invention may further comprise additives and/or auxiliary compounds.

According to embodiments, the auxiliary compounds may be selected from non-isocyanate-reactive solvents, surfactants, scavengers, like alkylorthoformate and in particular tri-isopropylorthofoiniate, antimicrobial agents, fire retardants, smoke suppressants, UV-stabilizers, colorants, plasticizers, internal mould release agents, rheology modifiers, wetting agents, dispersing agents and fillers.

According to embodiments, filler materials may be selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials. A particular use is the manufacturing of semi-structural and structural composites comprising basalt fibres, carbon fibres, flax fibres and/or glass fibres.

The combining and mixing of the polyisocyanates and the other ingredients to make the curable composition according to the invention preferably is to be conducted at ambient pressure and at a temperature between 5° C. and 45° C. and more preferably between 5° C. and 30° C. in order to avoid undesired premature reactions as much as possible.

According to embodiments, the polyisocyanate composition, trimerization catalyst composition and isocyanate reactive composition may be combined first and then the toughening agent comprising block copolymers and optional additives and/or auxiliary compounds may be added.

According to embodiments, all the ingredients needed to make the curable composition may be combined simultaneously.

The invention provides a method for making polyisocyanurate comprising materials with improved fracture toughness. Said method comprises at least the steps of allowing the curable composition according to the first aspect of the present invention to react. The start of the reaction may be accelerated by applying heat, like heating the curable composition to a temperature above 50° C. and preferably above 80° C. Then the curable composition cures fast (so-called snap-cure) while the temperature increases further (the reaction is exothermic).

According to embodiments, the method for making polyisocyanurate comprising materials with improved fracture toughness comprises reacting at an isocyanate index of at least 100, at least the curable composition according to the first aspect of the invention which comprises:
a) A polyisocyanate composition,
b) An isocyanate reactive composition comprising at least 50 mol %, preferably at least 70 mol %, more preferably at least 90 mol % diols calculated on the total number of mol isocyanate reactive compounds in the isocyanate-reactive composition,
c) A toughening agent comprising acrylic block copolymers,
d) A trimerization catalyst composition, and
e) Optionally further additives and/or auxiliary compounds.

Wherein the amount of polyisocyanates in the curable composition comprises at least 50 wt % polyisocyanates, preferably >60 wt % polyisocyanates calculated on the total weight of the reactive curable composition.

According to embodiments, the method for making polyisocyanurate comprising materials with improved fracture toughness comprises reacting at an isocyanate index of at least 100 at least the curable composition according to the first aspect of the invention (which comprises at least the components a) to e)) characterized in that the isocyanate-reactive compounds b) comprise compounds selected from diols such that the average molecular weight between cross-links ($M_c$) is >300 g/mol, preferably >500 g/mol, more preferably ≥700 g/mol.

According to embodiments, a moulding process may be used for making the polyisocyanurate comprising materials, in that case it may be conducted according to the cast moulding process, the compression moulding process, the resin transfer moulding process, and especially the vacuum assisted one, the resin infusion process, the prepregging process and the hand lay-up process. The process further may be conducted according to an injection-, an extrusion- or a pultrusion process. Microwave or induction curing may also be applied. The process may be conducted batch-wise, semi-continuously or continuously.

According to embodiments, the polyisocyanurate comprising materials may be blown products and the blowing agents may be selected from inert blowing agents and reactive blowing agents. Examples of inert blowing agents are alkanes, hydrofluorocarbons, hydrochlorofluorocarbons, expandable microbeads and inert gases like air, $N_2$, $CO_2$, CO, $O_2$ and He and examples of reactive blowing agents are azodicarbonamide and water. Water is the most preferred blowing agent. The actual amount of blowing agent needed depends on the ingredients used to make the polyisocyanate polyaddition products, on the production process, on the selected blowing agent and on the desired density. The determination of the amount of blowing agent once the ingredients for making the polyisocyanate polyaddition products, the process and the desired density have been selected, is daily routine for a person who is ordinary skilled in the art.

In addition to the above ingredients, other ingredients used in the art for making materials comprising a plurality of urethane, urea and/or isocyanurate groups may be used like other catalysts, e.g. for enhancing urethane formation, surfactants, fire retardants, colorants, pigments, anti-microbial agents, fillers, internal mould release agents, cell-stabilizing agents and cell-opening agents.

According to embodiments, the method for making the polyisocyanurate comprising materials of the invention comprises a process wherein the compounds of the curable composition are reacted at an isocyanate index in the range 100 up to 15000. Preferably the reaction is conducted at an index of preferably 100-500 and most preferably 100-300.

According to embodiments, the polyisocyanurate (PIR) comprising materials and the method for forming said polyisocyanurate comprising materials further comprises after the step of reacting at an isocyanate index in the range 100 up to 15000 the compounds of the curable composition, the step of curing the obtained composition at elevated temperature in order to form a cured polyisocyanurate comprising material/product. The curing may be conducted at a temperature between 50° C. and 350° C. and most preferably in the range between 125° C. and 250° C. This reaction may take between 5 seconds and 10 hours and preferably takes between 15 seconds and 2 hours. The process may be conducted at ambient pressure or at reduced or elevated pressure. Preferably heat is applied in order to bring the (curable) composition to a temperature above 50° C. and most preferably above 80° C. Then the curable composition may cure fast (so-called snap-cure) while the temperature increases further (the reaction is exothermic). Before curing the polyisocyanurate comprising products the (curable) composition may be fed into a mould in order to give it a certain shape or into a cavity of an object in order to provide the object with a polyisocyanurate interior, or onto a surface to provide such a surface with a polyisocyanurate cover, or it may be used to repair an object.

According to embodiments, the polyisocyanurate (PIR) comprising products may be blown products made at an isocyanate index in the range 100 up to 15000, preferably at an isocyanate index in the range 100-300 and wherein water and/or other blowing agent are added in an amount of for example 5 pbw. The actual amount of blowing agent needed depends on the ingredients used to make the polyisocyanurate comprising products, on the production process, on the selected blowing agent and on the desired density. The determination of the amount of blowing agent once the ingredients for making the polyisocyanurate comprising products, the process and the desired density have been selected, is daily routine for a person who is ordinary skilled in the art.

According to embodiments, polyisocyanurate comprising products having increased fracture toughness are disclosed made according to the method of the second aspect of the invention. In particular the polyisocyanurate comprising products have a glass transition temperature >100° C., preferably >120° C., more preferably in the range 120° C.-200° C.

According to embodiments, the polyisocyanurate comprising products have a glass transition temperature >100° C. and a fracture toughness value $G_{1c}$>1000 J/m², preferably $G_{1c}$>1500 J/m².

According to embodiments, the polyisocyanurate comprising products have a fracture toughness value $G_{1c}$>500 J/m², preferably $G_{1c}$>600 J/m² and a glass transition temperature >150° C.

According to embodiments, the polyisocyanurate comprising products have a glass transition temperature >100° C. and a toughness value $K_{1c}$>2 MPa·m$^{1/2}$.

According to embodiments, the polyisocyanurate comprising products have a glass transition temperature >150° C. and a toughness value $K_{1c}$>1 MPa·m$^{1/2}$.

The polyisocyanurate comprising products according to the present invention may be used in sporting goods, in high volume production of automotive parts, in train parts, aerospace, marine applications, wind power devices, window lineals, structural parts, adhesives, packaging, encapsulants, insulators and (spray) coatings.

The invention is illustrated with the following examples.

EXAMPLES

Chemicals used:
Base polyisocyanate containing 4,4'-MDI, 2,4'-MDI and polymeric MDI with NCO-value of 32.7%
Suprasec® 1306 (Huntsman): 4,4'-MDI polyisocyanate with NCO-value of 33.5%
PPG-230: polypropylene glycol with an average molecular weight 230 g/mol, OH value=480-500
PPG-425: polypropylene glycol with an average molecular weight 425 g/mol, OH value=260-270
Hoopol® F1394: PET polyester with an average molecular weight of 450 g/mol
Nanostrength® M51NP: nanostructured acrylic block copolymers consisting of 2 polymethylmethacrylate blocks (PMMA) and 1 polybutylacrylate blocks (PBuA)
Araldite® GY240: epoxy resin based on bisphenol-A Comparative Example 1: Polyisocyanurate Comprising Material not Containing Acrylate Block Copolymer Toughening Agents A curable composition was prepared by vacuum mixing an isocyanate- and polyol blend for 2 minutes. The isocyanate blend consists of 260.06 g base polyisocyanate. The polyol blend contains 0.32 g LiCl, 60.95 g of Araldite GY240 and 80.64 g PPG425. After cure for 15 minutes in heated mould (90° C.) the resin plate was demoulded and post-cured for 25 min at 180° C., including heat- and cool ramps at 3° C./min. SEN-3PB Fracture toughness testing (ISO13586) revealed a critical stress intensity factor ($K_{1c}$) of 0.714 MPa·m$^{1/2}$ and critical energy release rate ($G_{1c}$) of 221 J/m². Three point bending flexure testing (ISO178) revealed a flexural modulus of 2.90 GPa and a flexural strength of 124 MPa. DMTA revealed a $T_g$ of 214° C.

Example 1 (According to the Invention): A Toughened Polyisocyanurate Comprising Material Containing 6.4 wt % Acrylate Block Copolymer Toughening Agents A curable composition was prepared by vacuum mixing an isocyanate- and polyol blend for 2 minutes containing a trimerization catalyst and 6.4 wt/wt % of an acrylate block copolymer. The isocyanate blend consists of 226.83 g Base polyisocyanate and 23.83 g of Nanostrength® M51NP (acrylate block copolymer). The polyol blend contains 0.279 g LiCl, 53.43 g of Araldite® GY240 and 70.59 g PPG425. After cure for 15 minutes in a heated mould (90° C.) the resin plate was demoulded and post-cured for 25 min at 180° C., including heat- and cool ramps at 3° C./min. SEN-3PB Fracture toughness testing (ISO13586) revealed a critical stress intensity factor (KO of 1.27 MPa·m$^{1/2}$ and critical energy release rate ($G_{1c}$) of 591 J/m². Three point bending flexure testing (ISO178) revealed a flexural modulus of 2.77 GPa and a flexural strength of 120 MPa. DMTA revealed a $T_g$ of 208° C.

Example 2 (According to the Invention): A Toughened Polyisocyanurate Comprising Material Containing 4.9 wt % Acrylate Block Copolymer Toughening Agents A curable composition was prepared by vacuum mixing an isocyanate- and polyol blend containing a trimerization catalyst and 4.9 wt/wt % of an acrylate block copolymer for 2 minutes. The isocyanate blend consists of 219.44 g Suprasec® 1306 and 18.36 g of Nanostrength® M51NP (acrylate block copolymer). The polyol blend contains 0.302 g LiCl, 17.82 g of Araldite® GY240, 29.78 g PPG230 and 89.10 g Hoopol® F1390. After cure for 15 minutes in a heated mould (90° C.) the resin plate was demoulded and post-cured for 2 h at 140° C. SEN-3PB Fracture toughness testing (ISO13586) revealed a critical stress intensity factor (KO of 2.112 MPa·m$^{1/2}$ and critical energy release rate ($G_{1c}$) of 1702 J/m². Three point bending flexure testing (ISO178) revealed a flexural modulus of 3.05 GPa and a flexural strength of 134.2 MPa. DMTA revealed a Tg of 170° C.

Example 3 (According to the Invention): A Toughened Polyisocyanurate Comprising Material Containing Varying Amounts (wt %) of Acrylate Block Copolymer Toughening Agents Curable compositions with varying amount (wt/wt %) of an acrylate block copolymer were prepared by vacuum mixing the following blends for two minutes in presence of a trimerisation catalyst: a isocyanate blend, a isocyanate-Nanostrength M51NP blend and a polyol blend. The isocyanate blend consists of 100 wt/wt % of base polyisocyanate. The isocyanate-Nanostrength M51NP mixture contains 85.04 wt/wt % base polyisocyanate and 14.96 wt/wt % of Nanostrength® M51NP (acrylate block copolymer). This mixture was prepared by heating and stirring for 2 hours at 80° C. The polyol blend contains of 43.0 wt/wt % of Araldite® GY240 and 57.0 wt/wt % PPG425. The formulations of the curable compositions are shown in Table 1.

TABLE 1

| Nanostrength ® M51NP (wt/wt %) | isocyanate blend | isocyanate-nanostrength M51NP blend | Polyol Blend | Trimerisation catalyst |
| --- | --- | --- | --- | --- |
| 0.00 | 260.00 | 0.00 | 139.48 | 0.360 |
| 2.73% | 195.51 | 74.39 | 137.47 | 0.360 |
| 4.98% | 132.60 | 133.76 | 135.21 | 0.342 |
| 7.50% | 69.83 | 200.53 | 129.30 | 0.333 |
| 10.00% | 6.85 | 267.46 | 125.66 | 0.324 |

After cure for 30 minutes in a preheated mould (90° C.) the resin plate with a thickness of 4 mm were demoulded and post-cured in an oven for 25 min at 190° C., including heat- and cool ramps at 3° C./min. The fracture toughness was measured according to ISO 13586. The glass transition temperature was measured using dynamical mechanical analysis according to ASTM D 4065-1. The results are depicted in Table 2

TABLE 2

| Nanostrength ® M51NP (wt/wt %) | Glass transition temperature - $T_g$ ASTM D 4065-1 (° C.) | Critical energy release rate - $G_{1c}$ ISO13586 (J/m$^2$) | Critical stress intensity factor - $K_{1c}$ ISO13586 (Mpa · m$^{1/2}$) |
| --- | --- | --- | --- |
| 0.00 | 215 | 284 | 0.916 |
| 2.73% | 217 | 446 | 1.111 |
| 4.98% | 210 | 640 | 1.352 |
| 7.50% | 211 | 856 | 1.542 |
| 10.00% | 210 | 1112 | 1.704 |

The invention claimed is:

1. A structural polyisocyanurate composite comprising a polyisocyanurate matrix having a toughness value $G_{1c} > 500$ J/m$^2$ wherein the polyisocyanurate matrix comprises the reaction product of a curable composition comprising:
   a) a polyisocyanate composition,
   b) an isocyanate reactive composition comprising at least 50 mol % diols calculated on the total number of mol isocyanate reactive compounds in the isocyanate-reactive composition wherein the diols have a molecular weight (MW) below 1000 g/mol and comprise a mixture of (i) an aromatic diol and (ii) alkylene glycols and/or oxyalkylene glycols corresponding to the formula $C_nH_{2n}(OH)_2$ and $C_nH_{2n}O(OH)_2$,
   c) a trimerization catalyst composition, and
   d) optionally further additives and/or auxiliary compounds
wherein the amount of polyisocyanates in the curable composition comprises at least 50 wt % polyisocyanates calculated on the total weight of the curable composition and wherein the polyisocyanurate matrix is obtained by combining and mixing reactive ingredients (a) through (d) at an isocyanate index of at least 100; and wherein the polyisocyanurate matrix further comprises a second phase domain comprising a toughening agent comprising acrylic block copolymers wherein the acrylic block copolymer is a tri-block copolymer represented by Formula I:

A-B-A <span></span> Formula I:

wherein,
   A is a polyisocyanate/polyisocyanurate miscible block; and
   B is a polyisocyanate/polyisocyanurate immiscible block;
   wherein the amount of A to B expressed as fraction by mass is: A blocks=10%-80% and B blocks=90%-20%.

2. The structural polyisocyanurate composite according to claim 1, wherein the amount of polyisocyanates in the curable composition comprises at least 60 wt % polyisocyanates calculated on the total weight of the reactive curable composition.

3. The structural polyisocyanurate composite according to claim 1, wherein the aromatic diol is an aromatic polyester polyol.

4. The structural polyisocyanurate composite according to claim 1, wherein the alkylene glycols are selected from polyethylene glycol, polypropylene glycol-(1,2), polypropylene glycol-(1,3), polybutylene glycol-(1,4), polybutylene glycol-(2,3), polyhexanediol-(1,6), polyoctanediol-(1,8) and mixtures thereof.

5. The structural polyisocyanurate composite according to claim 1, wherein the block copolymer toughening agent is a self assembling block copolymer wherein at least one block is a polyisocyanate/polyisocyanurate miscible block having a glass transition temperature ($T_g$) above 100° C. and at least one block is a polyisocyanate/polyisocyanurate immiscible block having a $T_g$ below 0° C., and wherein the copolymer is present in the curable composition in a range from 0.1 wt % to 30 wt % based on the total weight of the curable composition.

6. The structural polyisocyanurate composite according to claim 1, wherein the block copolymer toughening agent is a self assembling block copolymer having a number average molecular weight (MW) of at least 1000 g/mol.

7. The structural polyisocyanurate composite according to claim 1, wherein polyisocyanate/polyisocyanurate miscible block of the block copolymer is selected from polymethylmetacrylate and/or polystyrene and the immiscible block is polybutylacrylate.

8. The structural polyisocyanurate composite according to claim 1, wherein the polyisocyanates are selected from aliphatic, cycloaliphatic, araliphatic and aromatic polyisocyanates.

9. The structural polyisocyanurate composite according to claim 1, wherein the trimerisation catalyst composition comprises alkali and/or earth alkali metal salts of organic carboxylic acids.

10. The structural polyisocyanurate composite according to claim 1, wherein the trimerisation catalyst composition comprises a lithium halide, an epoxy resin, and optionally a urea compound.

11. The structural polyisocyanurate composite according to claim 1, wherein the trimerisation catalyst composition is used in a quantity of from 0.001 to 10 wt % calculated on the total weight of the curable composition.

12. The structural polyisocyanurate composite according to claim 1, wherein the auxiliary compounds are selected from non-isocyanate-reactive solvents, surfactants, scavengers, antimicrobial agents, fire retardants, smoke suppressants, UV-stabilizers, colorants, plasticizers, internal mould release agents, rheology modifiers, wetting agents, dispersing agents and fillers.

13. The structural polyisocyanurate composite according to claim 1, wherein the auxiliary compounds comprise filler materials which are selected from wood chips, wood dust, wood flakes, wooden plates, paper, cardboard, sand, vermiculite, clay, cement, ground rubber, ground thermoplastics, ground thermoset materials, cork, natural fibers, synthetic fibers, mineral fibers, mineral fillers, nanoparticles, glass beads, ground glass, hollow glass beads, expanded beads, expandable beads, untreated waste, treated waste, woven textiles, non-woven textiles and mixtures thereof.

14. A process for making the structural polyisocyanurate composite according to claim 1, which comprises combining and mixing the reactive ingredients (a) through (d) and toughening agent at ambient pressure and at a temperature between 5° C. and 45° C.

15. A method for making the structural polyisocyanurate composite according to claim 1, wherein the method comprises combining and mixing the reactive ingredients (a) through (d) and the toughening agent, allowing the reactive ingredients to react at an isocyanate index of at least 100 and at a curing temperature above 50° C. thereby forming the structural polyisocyanurate composite.

16. The method for making the structural polyisocyanurate composite according to claim 15 wherein said method is a batch-wise, semi-continuously or continuously injection-, extrusion-, pultrusion- or moulding process.

17. The method for making the structural polyisocyanurate composite according to claim 15, wherein the isocyanate index is in the range 100 up to 15000.

18. The method for making the structural polyisocyanurate composite according to claim 15, wherein the curing temperature is between 50° C. and 350° C.

19. The structural polyisocyanurate composite according to claim 1, wherein the structural polyisocyanurate composite has a glass transition temperature >100° C., a fracture toughness value $G_{1c}$>1000 J/m² and/or toughness value $K_{1c}$>2 MPa·m$^{1/2}$.

20. The structural polyisocyanurate composite according to claim 1, wherein the structural polyisocyanurate composite has a glass transition temperature >150° C. and/or a toughness value $K_{1c}$>1 MPa·m$^{1/2}$.

* * * * *